No. 832,929. PATENTED OCT. 9, 1906.
W. STANLEY.
WEEDLESS FISH HOOK.
APPLICATION FILED JULY 6, 1905.
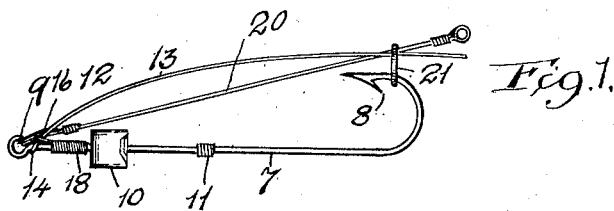
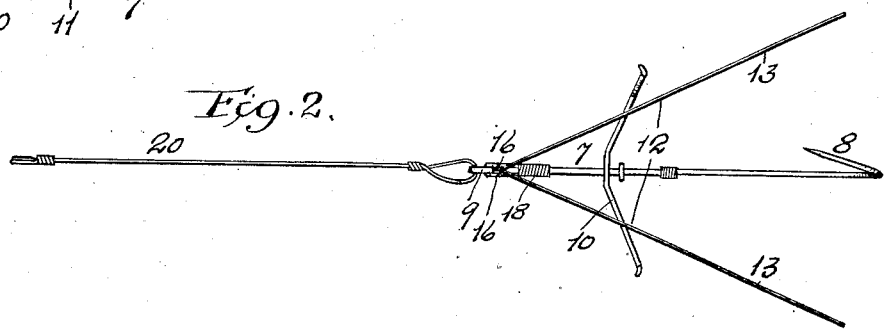
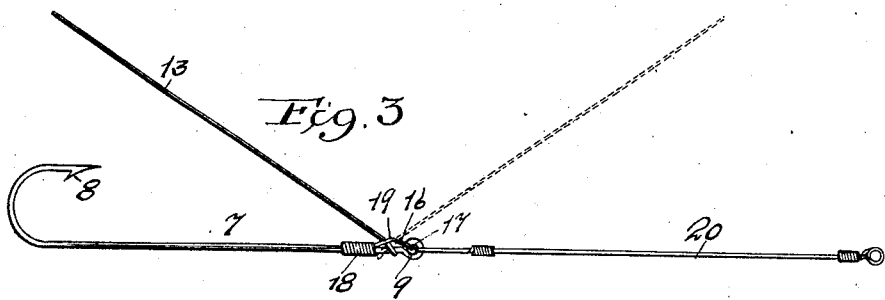
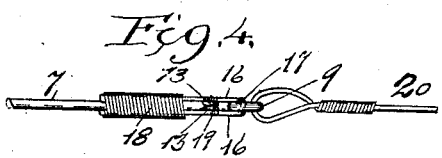
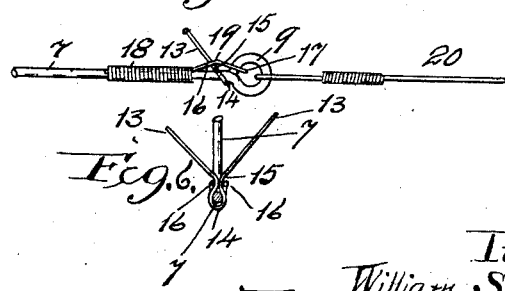
Witnesses:
Wm. P. Bond
C. F. Cooke
Inventor
William Stanley
By Banning & Banning
Attys.
THE NORRIS PETERS CO., WASHINGTON, D. C.

UNITED STATES PATENT OFFICE.

WILLIAM STANLEY, OF CHICAGO, ILLINOIS.

WEEDLESS FISH-HOOK.

No. 832,929.

Specification of Letters Patent.

Patented Oct. 9, 1906.

Application filed July 6, 1906. Serial No. 324,947.

*To all whom it may concern:*

Be it known that I, WILLIAM STANLEY, a citizen of the United States, residing in Chicago, county of Cook, and State of Illinois, have invented certain new and useful Improvements in Weedless Fish-Hooks, of which the following is a specification.

This invention has for its object to provide a guard for the hook-point so secured to the hook-shank that it will be movable to adapt itself to the varying conditions of use. The guard is so positioned and secured that it will leave an unobstructed barb for the strike of the fish and will at the same time fully protect the point against the entanglement of weeds, whether trolling or casting. The guard is so pivoted that when a caught fish starts to run with the line the position of the guard will be reversed, so that the prongs of the guard will always point away from the direction in which the line is running, thereby adapting the hook to the different conditions incident to fishing.

Another feature of the invention is the readiness with which the guard and leader can be pressed together and held in compact form for shipment, storage, or otherwise.

The hook can be used either with or without a spinner, the guard being so widely distended that it will not interfere in any way with the revolution of the spinner.

The invention consists in the features of construction and combination of parts hereinafter described and claimed.

In the drawings, Figure 1 is a side elevation of the hook of the present invention with the guard and leader held in position for storage; Fig. 2, the top plan view of the hook with the spinner as in use; Fig. 3, a side elevation of the hook without the spinner, showing in full lines the normal position of the guard and in dotted lines the position assumed by the guard when a fish is running with the hook, and Figs. 4, 5, and 6 enlarged details showing the method of securing the guard to the shank.

The device of the present invention comprises a hook of the usual formation having a shank 7 terminating in a barb 8 at one end and in an eye 9 at the opposite end. If desired, the shank may be provided with a spinner 10, which bears against a collar 11 on the shank, although many fishermen prefer to dispense with the spinner.

The guard 12, which more especially forms the subject-matter of the present invention, is of V-shaped formation and comprises diverging prongs 13, which are connected by means of an eye or yoke 14 of sufficient interior diameter, to embrace the hook-shank closely adjacent to the eye thereof. The guard-prongs at the point of connection with the eye-yoke (indicated by the numeral 15) touch one another, and this point of greatest contraction, which may be termed the "neck," is embraced by a pair of lateral guide-wires 16, which are formed integrally with one another, having their connecting end 17 passed through and secured by the eye of the hook-shank. The free ends of the guide-wires are secured to the hook-shank beyond the eye-yoke 14 by a winding 18, preferably a fine wire. The guide-wires are arched or bowed upwardly at their center points 19 a sufficient distance to prevent any turning or lateral motion of the guard-prongs and at the same time prevent any spreading or opening of the neck, which would impair the adjustment intended.

As shown, the outfit is completed by the provision of a leader 20 of a suitable character, and in order to facilitate the packing of the device into a compact form a ring 21 is provided which encircles the two free ends of the guard-prongs, the leader, and the hook adjacent to the barb. This adjustment of the parts is permitted by reason of the fact that the prongs are made out of spring-steel, which although normally straight, as shown in Figs. 2 and 3, may be bent down or bowed into the form shown in Fig. 1 to permit the ring to be inserted.

The arrangement is one which permits a free fore-and-aft swinging or pivotal movement of the guard-prongs from the position shown in full lines in Fig. 3 to the position shown in dotted lines; but the lateral guide-wires prevent any side motion or turning of the guard, so that the prongs will always be held in position immediately above and outside of the barb of the hook, except in cases where a fish has struck the hook and started to run in the opposite direction, in which case the guard-prongs will swing over into the position indicated in dotted lines, so that the convergent end of the guard will always point in the direction of travel of the hook, at least when any friction is brought to bear tending to swing the guard-prongs out of normal position. This prevents the prongs from becoming entangled with weeds after the fish has been hooked, which of course would not only tend to injure the prongs, but to permit the escape of the fish. The prongs are sufficiently elevated and divergent to provide an unobstructed hook for the strike of the fish, which is highly superior to an arrangement in which the guard is in contact with or closely adjacent to the point of the hook. The swinging movement of the guard will be limited by the size of the eye-yoke 14, which is elongated vertically a sufficient distance to permit the necessary swing or movement; but the movement will be limited, as indicated in Fig. 3, when the inner and outer ends of the opening are brought into abutment with the top and bottom of the hook-shank, respectively. The hook, being formed of much heavier material than the guard and carrying the bait, will normally ride beneath the guard with the point and barb of the hook extending upwardly in position to receive the strike of the fish.

What I regard as new, and desire to secure by Letters Patent, is—

1. A weedless fish-hook comprising a hooked shank and a guard having divergent prongs pivoted to the shank and adapted to be moved through the arc of a circle, and having its movement in both directions limited, substantially as described.

2. A weedless fish-hook comprising a hooked shank and a guard pivoted to the shank, and comprising divergent prongs pivoted to the shank by means of a connecting eye-yoke encircling the shank, the yoke having proper interior diameter to permit a limited movement through the arc of a circle, substantially as described.

3. A weedless fish-hook comprising a hooked shank and a guard pivoted to the shank, and comprising divergent prongs pivoted to the shank by means of a connecting eye-yoke encircling the shank, the yoke having proper interior diameter to permit a limited movement through the arc of a circle, and guide-wires secured to the hooked shank adjacent to the contracted end of the guard for preventing lateral movement of the guard, substantially as described.

4. A weedless fish-hook comprising a hooked shank, having an eye at one end, the guard having divergent prongs connected together by means of an eye-yoke surrounding the hooked shank and forming a neck at the point of greatest contraction, permitting the guard to be moved through the arc of a circle from a position in which its prongs lie above and away from the point of the hook to a position in which the prongs extend diagonally away from the point, and guides formed of a single piece of wire passed through the eye of the shank and embracing the neck of the guard, and having their ends secured to the shank of the hook for preventing turning or lateral movement of the guard and permitting a fore-and-aft swinging movement, substantially as described.

5. A weedless fish-hook comprising a hooked shank, having an eye at one end, a guard having divergent prongs connected together by means of an eye-yoke surrounding the hooked shank and forming a neck at the point of greatest contraction, permitting the guard to be moved through the arc of a circle from a position in which its prongs lie above and away from the point of the hook to a position in which the prongs extend diagonally away from the point, and guides formed of a single piece of wire passed through the eye of the shank and embracing the neck of the guard, and having their ends secured to the shank of the hook for preventing turning or lateral movement of the guard and permitting a fore-and-aft swinging movement, the guard-wires being arched or bowed up at the point of contact with the neck, substantially as described.

WILLIAM STANLEY.

Witnesses:
SAMUEL W. BANNING,
WALKER BANNING.